United States Patent [19]

Levine

[11] 4,021,661

[45] May 3, 1977

[54] SUBMARINE OPTICAL COMMUNICATION SYSTEM WITH FIBER OPTIC DEPTH COMPENSATOR

[75] Inventor: Arnold M. Levine, Chatsworth, Calif.

[73] Assignee: International Telephone and Telegraph Corporation, New York, N.Y.

[22] Filed: May 1, 1975

[21] Appl. No.: 573,738

[52] U.S. Cl. .............................. 250/199; 325/116; 350/96 B
[51] Int. Cl.² ......................................... H04B 9/00
[58] Field of Search .............. 178/DIG. 2, DIG. 38; 250/199; 325/116; 340/2 R, 5 R, 380; 350/96 B

[56] References Cited

UNITED STATES PATENTS

| | | | |
|---|---|---|---|
| 3,258,595 | 6/1966 | Galante | 178/DIG. 38 X |
| 3,788,255 | 1/1974 | Tennyson | 343/709 X |
| 3,818,523 | 6/1974 | Stillman, Jr. | 340/2 |
| 3,903,496 | 9/1975 | Stimler | 250/199 X |

Primary Examiner—Benedict V. Safourek
Assistant Examiner—Aristotelis M. Psitos
Attorney, Agent, or Firm—William T. O'Neil

[57] ABSTRACT

A system for providing secure communication by use of optical frequency transmission between an aircraft or spacecraft and a deeply submerged submarine. The submarine extends at least one fiber optic cable terminated in a lens arrangement. A flotation unit insures that the cable is extended substantially vertically to a point approaching, but not penetrating the surface of the sea. The thickness of the water layer between the surface and the cable upper end is thereby such as to reduce the attenuation of transmitted and received optical signals. Submarine communications may thereby be effected through modulated light beams while the submarine itself remains at a greater and more secure depth.

7 Claims, 2 Drawing Figures

SUBMARINE OPTICAL COMMUNICATION SYSTEM WITH FIBER OPTIC DEPTH COMPENSATOR

BACKGROUND OF THE INVENTION

1. Field of the Invention

The invention relates generally to the subject of communication with submarines or other submerged objects, particularly through modulated light beams.

2. Description of the Prior Art

In the prior art the problem of communicating with submarines at sea has received much attention. Obviously, submarines can surface and communicate by radio in the same manner as surface vessel communication is commonly conducted. In navel operational situations however, the missions assigned to submarines are considerably different from those undertaken by surface vessels. It is a great disadvantage if a submarine is required to surface in order to conduct communications, because of its great vulnerability when surfaced, and also because communications are thereby precluding during periods when surfacing is not permissible.

Radio communication systems have been devised permitting some degree of communication with submerged submarines, however, these are sharply limited in their application because of attenuation problems and also because they provide a means whereby hostile forces may locate and identify them when transmissions are made from the submarine.

The use of surface buoys connected by electrical cable to a submarine permit the maintenance of relatively safe depth, but are also suspectible to surface detection.

Communication with a friendly aircraft over the area occupied by a submerged submarine or with orbiting satellites is possible using the highly directive properties of modulated laser light beams. The energy of such beams does not tend to be dispersed beyond the immediate location, thereby readily improving the security of the communication link. A laser beam (the preferred type of optical communication medium) is also known for its capability for penetrating at least some depth of sea water, although there are situations in which submarine operations are conducted well below the levels at which even the most powerful laser beam could be expected to penetrate.

The manner in which the present invention deals with the problems of the prior art to provide a unique arrangement for submarine communication, which is both highly secure, from the point of view of integrity of the communication link, and does not provide a substantial opportunity for hostile identification of a submarine and its location, will be seen as this description proceeds.

SUMMMARY OF THE INVENTION

The present invention comprises a submarine communication system whereby a flotation device is permitted to deploy a fiber optic cable vertically upward in the water, toward, but not through, the sea surface from a deep submarine location. Optical receiver and transmitter components (preferably laser units) are located within the submarine itself and receive and transmit respectively through this fiber optic cable, which is terminated at the upper end through an appropriate lense arrangement within the flotation device. Laser transmissions are accordingly directed substantially vertically (or at some small angle from the vertical) and receive energy from a friendly aircraft or satellite device reaches the laser receiver in the submarine through the same fiber optic cable. The basic concepts of the invention may also be practiced through the use of substantially parallel separate receiving and transmitting fiber optic cables, if desired. The relative size and complexity of the device is so relatively minimal (at least in respect to those components outside the hull of the submarine) that the addition of a second fiber optic cable is not significantly disadvantageous.

A detailed discussion of a practical arrangement for the implementation of the invention is hereinafter presented.

BRIEF DESCRIPTION OF THE DRAWING

A single FIGURE drawing illustrates the arrangement of the present invention for a submarine-to-friendly-aircraft communication configuration.

DESCRIPTION OF THE PREFERRED EMBODIMENT

Figure 1:
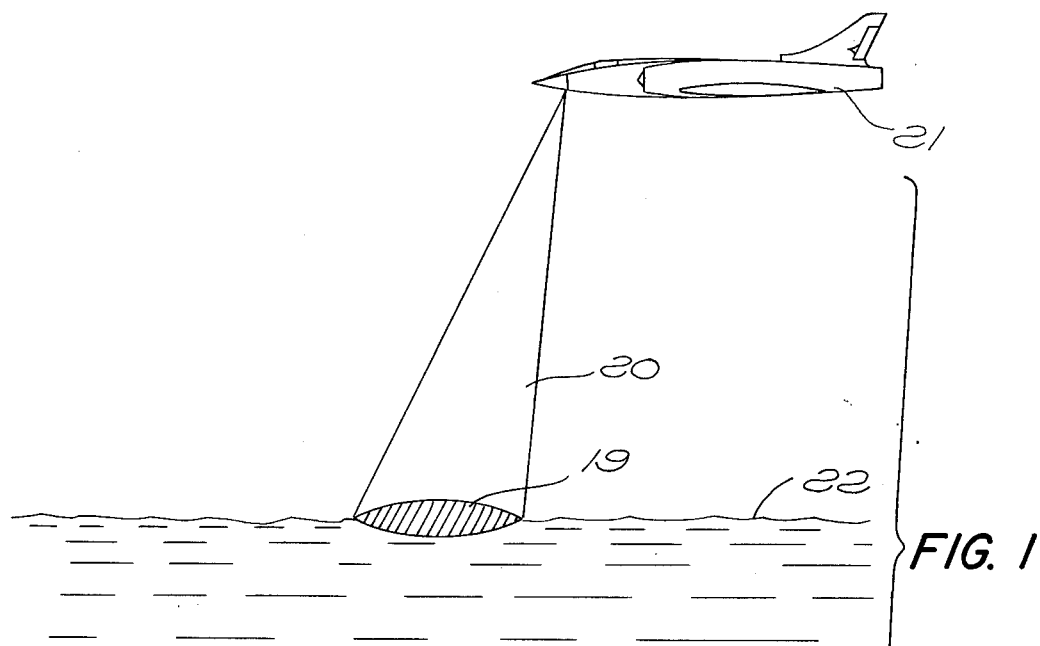

Referring now to the FIGURE, the submarine, with hull 10 and super-structure 23, submerged below the sea surface 22, carries a coil of fiber optic cable 16 terminating on one end at laser transmitter 17 and laser receiver 18. These components 17 and 18 are to be understood to be within the interior of the submarine hull 10, however, the coiled fiber optic cable coil 16 is in sea water, since the interior of the super-structure 23 is open to the sea through the open-ended generally cylindrical guide member 15.

The passage of the fiber optic cable 16 through the hull of the submarine to the transmitter and receiver 17 and 18 is no more difficult of accomplishment than the feed-through of an electrical cable, such as 27. Herein lies one of the more significant ancillary advantages of the present invention in that not telescoping arrangements having sliding joints which must be water tight (such as frequently encountered in connection with a periscope, for example) are required. Moreover, the fiber optic cable 16 which extends between the flotation device 24 and the submarine need not maintain a straight path in the operative position illustrated. That particular advantage accrues from the known characteristics of fiber optic cables as conductors of light energy.

The flotation device 24 is understood to contain a lens system optically coupled to the upper or second end of the fiber optic cable, so that in the operative position, laser signals from transmitter 17 are directed substantially upwardly (or vertically). Similarly, received laser signals from the aircraft 21 (for example) are received by the lens system 28, coupled into the cable 16, and are received by the receiver 18. As illustrated, the laser beam 20, both in a transmitting and receiving sense between the sea surface 22 and the aircraft 21, is focused over an area 19 on the sea surface in order to eliminate critical relationships which might be upset by perturbations of the flotation unit 24 from an optimum position due to sea turbulence, currents, submarine motion, etc.

The cable 16, shown coiled within the super-structure interior 23 essentially corresponds to the non-operative situation illustrated where the flotation device 24 rest within the guide member 15. Directly above however, the extended cable 12 will be recognized to be a portion of that uncoiled from 16 when the cable release and coiling mechanism 26 permits the upward extension of 24 along with cable 12, (from coil 16). The cable release and coiling release and coiling mechanism 26 is readily implemented in accordance with ordinary mechanical skills. It may, for example, consist of an electrically driven cable drive unit which passes the cable between at least one pair of opposing pulley wheels or shaped rollers. An electrical drive unit within 26 may be readily controlled in accordance with power and control connections included in an electrical cable 27 from within the submarine hull. Declutching of the cable drive unit or an appropriate mechanical linkage separating the rollers from the cable would provide a useable release mechanism when it is desired to permit the flotation unit to extend the device upward. Re-imposition of the compressive contact of roller pairs against the cable would constitute an acceptable and typical means of providing for the re-coiling of the cable. Those rollers may be power driven from within 26 to "reel in" and store the cable 12 within the super-structure 23.

In using the terms re-winding, re-coiling and "reeling in", it is to be understood that no particular configuration of the cable in the non-operative position within the super-structure 23 is required. Although the cable is illustrated as neatly coiled at 16, it may, in fact, be permitted to lay randomly, the only requirement being that there be no structure within 23 which could permit the cable to become entangled. The fiber optic cable, or cables, if two are to be used in an alternative arrangement, are quite flexible, and therefore, unusual structures for their handling are not considered necessary.

A solid sleeve 11, surrounding the portion of the cable 12 adjacent to 24, is intended to provide a certain amount of stiffness so that a counterweight 13, pivotally attached at 29 to 11 through a rod 14, can exert a stabilizing influence tending to keep the sleeve 11 relatively erect and therefore the lens 28 "looking" generally upwardly. It will be noted that the counterweight stabilizer 13 is illustrated in dotted form when the entire system is in the non-operative position to show that it can be permitted to fold upwardly and thereby not restrict the return of the flotation device 24 within the hollow cylindrical housing or guide member 15.

The applicable technology permitting the construction of the laser transmitter 17 and laser receiver 18 by persons skilled in these arts, is widely available in the literature. A summary with copious bibliographical references setting forth that technology is contained in the text entitled "Radar Handbook" by Merrill I. Skolnik (McGraw Hill 1970), especially in Chapter 37.

It will be realized that the requirements for implementations of these devices 17 and 18 are somewhat less severe than encountered in laser radar arrangements. This is because the intent is not to emit and receive ranging pulses, but rather to transmit for a predetermined time and then receive for a second predetermined time according to some predetermined program. Thus, the block 25 may include only a shutter device for selectively connecting the optical transmission path through the fiber optic cable to either the transmitter or receiver, as required. A duplexer function as commonly understood in the radar arts, is not required. Moreover, the nature of the optical beam modulation from 17 or from the aircraft 21 is not a part of the present invention. The options available in this regard are well known to those skilled in this art.

In the extended, or operative position of the cable and flotation device 24, it will be apparent that no detectable apparatus extends through the sea surface. The penetrating qualities of laser beams are such that the flotation device 24 can place the aperture of the system (i.e., lens 28) sufficiently below the sea surface 22 to avoid the more disturbing aspects of surface turbulence and wave motion, these phenomena always having represented a serious problem in the employment of "snorkel" devices used by submarines for various purposes.

Figure 2:
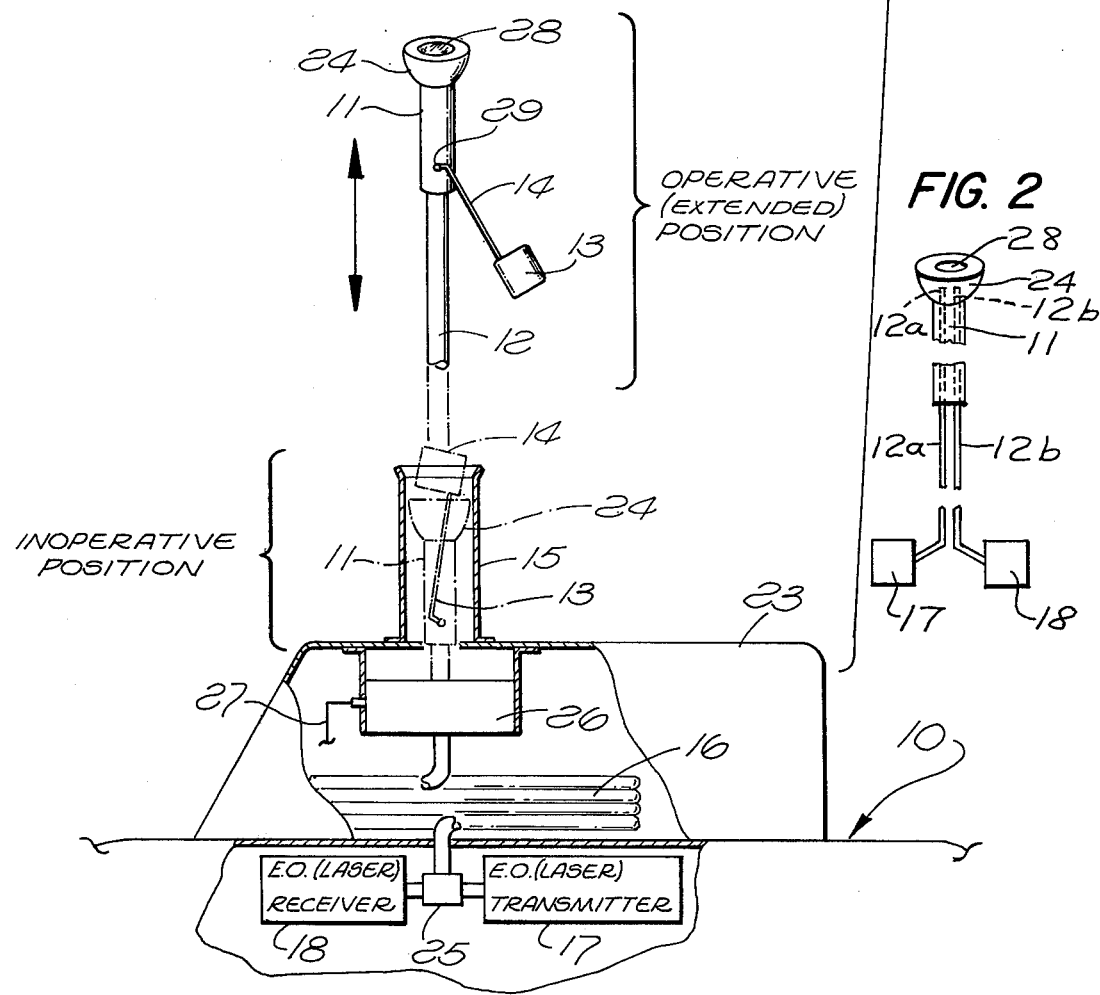

Various modifications within the spirit of the invention will suggest themselves to those skilled in this art, once the inventive principles are understood. For example, several stabilizers on the order of 13 can be provided about the tubular portion 11, thereby improving the stability of the device in the operative position. Moreover, it is relatively easy to provide a second fiber optic cable as shown in FIG. 2, mechanically parallel to the first one, so that separate cables 12a and 12b for transmitting and receiving respectively, are available. In this case, the shutter (or optical switch device) 25, would not be required, the cables simply passing directly to their respective connections; one to transmitter 17 and the other to receiver 18 in that event. At the optical coupling to lens 28, very little accommodation is required for the additional cable in view of the nature of the highly directive laser beam, that is, there will be no substantial diversion of energy between transmitting and receiving cables.

Still further, a second lens system, duplicating 28, can obviously be supplied so that each cable has its own lens providing optimum coupling into and out of each of the cables where two cables are used.

In accordance with the foregoing it is intended that many such variations are possible and these obviously fall within the scope of the invention, as defined by the appended claims.

The usefulness of the device described is not limited to the described communication system, but also is useful for various under-water telemetering applications, such as in connection with off-shore oil well drilling equipment.

What is claimed is:

1. A system for optical communication between a submarine submerged below the sea surface and a vehicle above the sea surface comprising:
   at least one flexible fiber optic cable, a first end thereof extending through the hull of said submarine;
   optical transmitting and receiving means operatively connected to said cable first end within said submarine for transmitting and receiving light energy signals through said cable;
   flotation means connected to the second end of said cable for exerting an upward bouyancy force sufficient to extend said cable in an upward direction for a predetermined distance;
   cable control means controllable from within said submarine for selectively permitting said flotation means to extend said cable to a first operative position and to rewind said cable to a second non-operative position;
   and lens means associated with said flotation means and optically coupled to said cable second end to direct optical signals from said transmitting means generally upward and to direct external generally downwardly directed signals into said cable for reception by said receiving means.

2. Apparatus according to claim 1 in which said cable comprises two separate fiber optic cables one first end of which is optically connected to said transmitting means, the other cable first end being optically connected to said receiving means, and both cable second ends being optically connected to said lens means.

3. Apparatus according to claim 1 in which said optical transmitting means and said receiving means are laser transmitter and receivers, respectively.

4. Apparatus according to claim 3 in which said cable comprises two separate fiber optic cables one first end of which is optically connected to said transmitting means, the other cable first end being optically connected to said receiving means, and both cable second ends being optically connected to said lens means.

5. Apparatus according to claim 1 including a super-structure mounted on the top of said submarine hull, said super-structure having a generally cylindrical hollow guide member open to the sea at its top and connected to the interior of said super-structure at its bottom end, said cable control means thereby providing for storage of said rewound cable within said super-structure, said flotation and lens means being contained within said guide member in said non-operative cable position.

6. Apparatus according to claim 1 including a super-structure mounted on the top of said submarine hull, said super-structure having a generally cylindrical hollow guide member open to the sea at its top and connected to the interior of said super-structure at its bottom end, said cable control means thereby providing for storage of said rewound cable within said super-structure, said flotation and lens means being contained within said guide member in said non-operative cable position.

7. Apparatus according to claim 3 including a super-structure mounted on the top of said submarine hull, said super-structure having a generally cylindrical hollow guide member open to the sea at its top and connected to the interior of said super-structure at its bottom end, said cable control means thereby providing for storage of said rewound cable within said super-structure, said flotation and lens means being contained within said guide member in said non-operative cable position.

* * * * *